May 10, 1927.

R. L. STINCHFIELD 1,627,935

LAMINATED FILM WHICH INCLUDES A LAYER OF POLYMERIZED VINYL CHLORIDE

Filed April 1, 1926

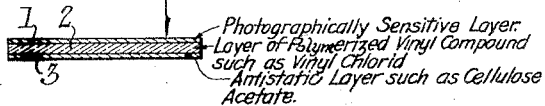

FIG. 1.
- Photographically Sensitive Layer.
- Layer of Polymerized Vinyl Compound such as Vinyl Chlorid
- Antistatic Layer such as Cellulose Acetate.

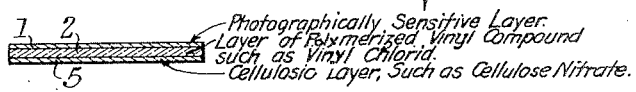

FIG. 8.
- Photographically Sensitive Layer.
- Layer of Polymerized Vinyl Compound such as Vinyl Chlorid.
- Cellulosic Layer, Such as Cellulose Nitrate.

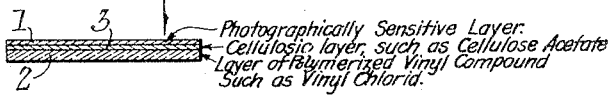

FIG. 2.
- Photographically Sensitive Layer.
- Cellulosic layer, such as Cellulose Acetate
- Layer of Polymerized Vinyl Compound Such as Vinyl Chlorid.

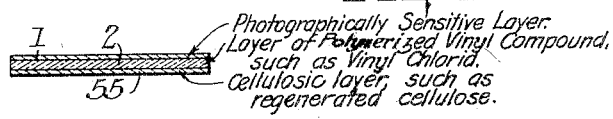

FIG. 9.
- Photographically Sensitive Layer.
- Layer of Polymerized Vinyl Compound, such as Vinyl Chlorid.
- Cellulosic layer, such as regenerated cellulose.

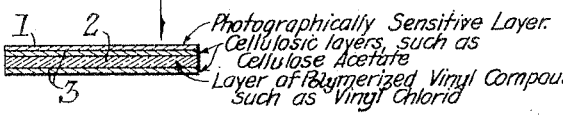

FIG. 3.
- Photographically Sensitive Layer.
- Cellulosic layers, such as Cellulose Acetate
- Layer of Polymerized Vinyl Compound, such as Vinyl Chlorid

FIG. 10.

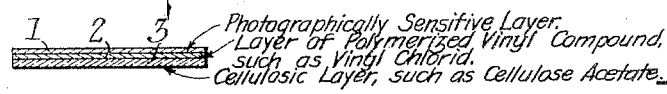

- Photographically Sensitive Layer.
- Cellulosic Layer, such as Cellulose Nitrate.
- Layer of Polymerized Vinyl Compound, such as Vinyl Chlorid.

FIG. 4.

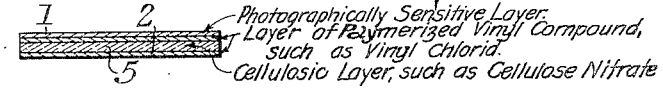

- Photographically Sensitive Layer.
- Layer of Polymerized Vinyl Compound, such as Vinyl Chlorid.
- Cellulosic Layer, such as Cellulose Acetate.

FIG. 11.

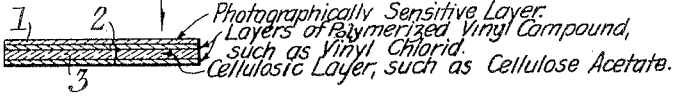

- Photographically Sensitive Layer.
- Layer of Polymerized Vinyl Compound, such as Vinyl Chlorid.
- Cellulosic Layer, such as Cellulose Nitrate FIG. 5.
- Photographically Sensitive Layer.
- Layers of Polymerized Vinyl Compound, such as Vinyl Chlorid.
- Cellulosic Layer, such as Cellulose Acetate.

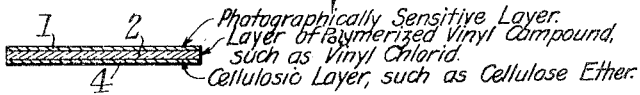

FIG. 6.
- Photographically Sensitive Layer.
- Layer of Polymerized Vinyl Compound, such as Vinyl Chlorid.
- Cellulosic Layer, such as Cellulose Ether.

Ray L. Stinchfield,
INVENTOR,

BY M. M. Perrins
ATTORNEY.

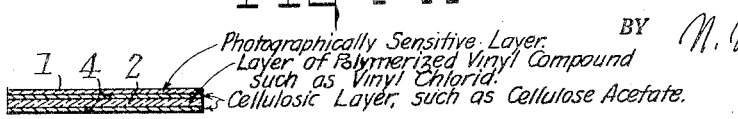

FIG. 7.
- Photographically Sensitive Layer.
- Layer of Polymerized Vinyl Compound such as Vinyl Chlorid.
- Cellulosic Layer, such as Cellulose Acetate.

Patented May 10, 1927.

1,627,935

UNITED STATES PATENT OFFICE.

RAY L. STINCHFIELD, OF ROCHESTER, NEW YORK, ASSIGNOR TO EASTMAN KODAK COMPANY, OF ROCHESTER, NEW YORK, A CORPORATION OF NEW YORK.

LAMINATED FILM WHICH INCLUDES A LAYER OF POLYMERIZED VINYL CHLORIDE.

Application filed April 1, 1926. Serial No. 99,078.

This invention relates to laminated films which include a layer of a polymerized vinyl compound.

One object of the invention is to provide films, the flexibility of which is greatly improved by the presence of a layer of polymerized vinyl compound while minor drawbacks incident to such layer are overcome by one or more cooperating layers. Another object of the invention is to provide laminated films which are suitable as supports for light-sensitive photographic coatings, said films containing a layer of a polymerized vinyl compound, such as a halid. Another object of the invention is to provide laminated films of exceptional flexibility and strength because of the presence therein of a layer of polymerized vinyl halid and yet are substantially free from electrification or "static" effects by reason of a cooperating anti-static layer or layers. Still another object of the invention is to provide laminated films in which a layer of polymerized vinyl compound, is partially shielded by one or more layers of protecting material. Another object of the invention is to provide laminated films having the characteristics hereinabove noted combined with a useful non-inflammable or slow-burning quality. Further objects will hereinafter appear.

In the accompanying drawing,—

Fig. 1 is a diagrammatic sectional view upon an exaggerated scale of a film embodying one example of my invention.

Figs. 2 to 11 inclusive are similar views of modifications.

While films embodying my inventions are of general applicability. wherever flexible films are employed, they are especially useful in the photographic art as supports for light-sensitive photographic emulsions. I shall, therefore, dwell considerably upon this application of my invention by way of illustration.

Among the qualities desirable in photographic films are flexibility, strength, transparency, necessary thinness, waterproof quality, resistance to scratching and heat, no harmful effect on the sensitive coating, antistatic quality, and as low inflammability as is practical. It will be observed that many of these qualities are also useful in arts other than photography.

I have found that films having the above listed qualities may be produced by combining a layer of a polymerized vinyl compound with one or more cooperating layers of suitable colloid material. Of the available polymerized vinyl compounds, the halides are the most useful and least expensive to manufacture. In the preferred embodiment of my invention I employ a layer of polymerized vinyl chloride in which the polymerization has been carried to the stage where the material is soluble in monochlor benzol but insoluble in acetone. This material is conveniently called $\beta$ caoupren chloride. In said preferred form the layer of polymerized vinyl chloride may slowly pass into other forms of polymerization, but this is unimportant if the necessary mechanical and photographic qualities, which were in the initial $\beta$ form are maintained. While polymerized forms of vinyl acetate, vinyl chloracetate or vinyl bromide, etc. are comprised within the broader aspects of our invention, the polymerized chloride and more particularly the $\beta$ caoupren chloride has great advantages over the others.

Films prepared from $\beta$ caoupren chloride are transparent, strong and remarkably flexible as compared to the ordinary films of cellulosic material now available. They can be made to stand many times the number of Schopper folds which cellulose nitrate films of the same thickness will stand before breaking. Moreover, they have very high electrical insulating properties and are very non-hygroscopic. But they are very readily electrifiable. Charges accumulate upon them and then discharge. Consequently when employed alone as supports for light-sensitive photographic emulsions, electric discharges tend to take place in the camera and in the treating or printing room, the flashes from which fog the emulsion in spots and give the very undesirable effect known in the art as "static." Furthermore, the surfaces of these films, as shown in the microscope, sometimes form minute superficial cracks. A local concentration of these cracks formed by undue pressure at one spot, may give a hazy translucent effect at the spot, called the "pearl disease."

I have found that the superflexibility and other advantages of the $\beta$ caoupren chloride films may be retained to a very high extent and yet the static disadvantages of the film be overcome by covering one or more of the surfaces with a suitable cooperating colloid layer. The latter tends also to oppose surface cracks or "pearl disease" in the former. This cooperating layer I prefer to make of cellulosic material, such as cellulose acetate, cellulose ether, or cellulose nitrate or mixtures of two or more of them or even regenerated cellulose. In the preferred form of my invention I employ a coating of cellulose acetate, because this remarkably combats static effects in the β caoupren chloride layer.

When electrified, cellulose acetate accumulates charges of the opposite sign to those accumulated by caoupren chloride under parallel circumstances. Thus if a sheet of β caoupren chloride be rubbed until electrified and a sheet of cellulose acetate be similarly rubbed until electrified it will be found that the two sheet strongly attract each other and that the charges tend to neutralize each other when the sheets are brought into contact. This neutralization tendency persists even when a laminated film, comprising layers of these substances is rubbed.

It is also noted that cellulose acetate, in all its various commercial forms, is more hygroscopic than β caoupren chloride and has a higher electrical conductivity. It is true regardless of the particular percentage of combined acetic acid present in it. Of course, the hygroscopicity is very small, but the amount which is retained by the acetate in equilibrium with the atmosphere is more than that retained by β caoupren chloride. While both of these materials may be used as electrical insulators, nevertheless, the conductivity of the cellulose acetate, probably by reason of its larger hygroscopicity, is greater than that of the caoupren chloride. The conductivity is extremely small, and yet it is sufficient to reduce the potential of static charges formed on films below the harmful discharge point. While I do not wish to be confined to any particular theory, it seems probable that the anti-static effect of the cellulose acetate with respect to the β caoupren chloride is due partly to its tendency to generate charges of opposite sign and partly to its relatively greater conductivity, induced by its superior hygroscopicity.

I shall now take up various embodiments of my invention, but it will be understood that the latter is not restricted to the details thus given, except as indicated in the appended claims.

In Fig. 1 there is illustrated a relatively thicker supporting layer 2 of polymerized vinyl compound, preferably a transparent, superflexible, strong, water-resisting and substantially non-inflammable layer of β caoupren chloride. Upon one face of layer 2 is spread the light-sensitive photographic material 1, preferably a gelatine-silver-halid developing-out emulsion of the usual type,—say, an emulsion of sufficient speed to cause it to be fogged by static discharges taking place on layer 2. Upon the back of layer 2 and practically coextensive therewith is a relatively thinner layer or backing of anti-static material, preferably of cellulosic material, such as cellulose acetate, for example. This cellulose acetate layer 3 is likewise transparent, flexible and usefully water-resistant, though it has more hygroscopicity than layer 2.

I prefer to prepare a supporting layer 2 of β caoupren chloride and then treat the latter on the back with a suitable cellulose acetate backing solution or varnish. One example of such a solution comprises acetone-soluble cellulose acetate 100 parts, monochlornaphthalene 10 to 30 parts, acetone 400 to 1200 parts and enough cyclohexanone to promote adhesion between the layers. Any equivalent substance which will not cause precipitation in the cellulose acetate dope and yet will "bite" the vinyl halide layer, may be used in place of cyclohexanone. The application of this varnish follows the technique usually employed in preparing laminated or backed films.

Of course, layers or skins of cellulose acetate and β caoupren chloride may be formed separately and then the two skins united by moistening their adjacent surfaces with a common solvent and pressing them together. I prefer, however, the use of a backing varnish as hereinabove described.

The film shown in Fig. 1, has most remarkable flexibility as compared with ordinary cellulosic films, and yet has the other necessary qualities, including that of being anti-static. The relative thicknesses of the layers 2 and 3 can be varied, while still retaining their useful cooperative effects. In the preferred form of my invention the sum of the thicknesses of layers 2 and 3 comes within the range of thicknesses customarily employed in the photographic film art.

In Fig. 2 the relative positions of the parts are changed, the cellulosic layer 3, such as cellulose acetate, being interposed between the layer 2 of vinyl compound and the light-sensitive emulsion layer 1. This is not as effective as the construction in Fig. 1 for the prevention of static, but it assists in promoting adhesion between the emulsion 1 and the vinyl halid layer 2. Moreover, the cellulosic layer 3 protects the sensitive emulsion from any free chlorine compounds liberated in the vinyl chloride layer 2. These will ordinarily not be present if the layer 2 is properly manufactured with proper colloidizers: but the interposition of layer 3 is an insurance against hazards of manufacture.

In Fig. 3 I have shown a film combining the advantages of those shown in Figs. 1 and 2. The supporting layer 2 of vinyl halid, such a β caoupren chloride, has upon both of its faces cellulosic layers 3 such as cellulose acetate. These may be put in position in the way described in connection with the film shown in Fig. 1. The emulsion layer 1 is located, after substratuming in the usual way, upon one of these cellulosic layers. Such a film in addition to all the usual qualities, has high resistance to static, enormous flexibility and full protection of the emulsion from any deleterious chlorine substances.

Instead of making the layer 2 of vinyl compound relatively thick and the cellulosic layer relatively thin, I may make the reverse construction, as illustrated in Fig. 4. Here the main layer 3 of cellulose acetate is united to a thin layer 2 of β caoupren chloride upon which is located the photographically sensitive layer 1. Even in this relatively small proportion the β caoupren chloride most surprisingly increases the flexibility of the film,—that is, it increases the number of test folds which can be repeated in the film without breaking.

Fig. 5 shows a film similar to that of Fig. 4, except that the relatively thicker layer 3 of cellulose acetate has a layer of β caoupren chloride on each of its faces, thus still further increasing the flexibility.

In Fig. 6 I have shown a construction similar to that in Fig. 1, in which the layer of β caoupren chloride 2 carrying the light-sensitive emulsion 1 on one face has an antistatic layer 4 on the back, the latter being cellulose ether instead of cellulose acetate. The most readily available ether is a water-insoluble ethyl cellulose. An ether varnish for making such a layer may comprise water-insoluble ethyl cellulose 100 parts, 200 to 600 parts of methyl acetate and 200 to 600 parts of cyclohexanone. While cellulose ethers do not electrify in the opposite sense to the caoupren chloride, nevertheless, they are sufficiently electrically conducting or hygroscopic to usefully restrain static trouble.

Fig. 7 shows a construction analogous to Fig. 3 with the layer 2 of β caoupren chloride coated on both faces with layers 4 of cellulose ether, the emulsion layer 1 being located upon one of these layers.

In Fig. 8 I have shown a construction analogous to that in Fig. 1 with a main layer of β caoupren chloride 2 bearing upon one of its faces the light-sensitive layer 1, and upon its opposite or rear face a layer 5 of nitrocellulose. An example of a suitable nitrocellulose varnish for preparing such layer is 100 parts of nitrocellulose, 30 to 100 parts of fusel oil or butyl alcohol, 10 to 30 parts of monochlornaphthalene or triphenyl phosphate, 400 to 1200 parts of a mixture of acetone and methyl alcohol (say equal proportions) and enough cyclohexanone to make the varnish stick. The nitrocellulose may be any of the usual nitrocelluloses employed in varnish, the percentage of nitrogen varying over a considerable range, as is well understood by those skilled in the art. This film has the least anti-static quality of any thus far described, being dependent upon the hygroscopicity of the layer 5. This hygroscopicity may be derived from the specific nitrocellulose employed, or the addition of hygroscopic substances to layer 5 or both. When it is desired to add hygroscopic materials to the layer 5 it is only necessary to use those described in the prior art, such as Patent No. 1,431,900, Seel, October 10th, 1922. Where the nitrocellulose layer is relatively thin, the β caoupren chloride tends to make the film slow burning.

The layer 5 of nitrocellulose in Fig. 8 may be replaced by one of wholly or partially regenerated cellulose 55, as shown in Fig. 9. Thus I may coat the supporting layer 2 of β caoupren chloride in Fig. 8 with the emulsion layer 1 and with a layer of nitrocellulose. The latter may then be treated so as to superficially, at least, regenerate cellulose by denitration. Any of the well known denitration agents may be employed provided they are sufficiently washed from the product. The regenerated cellulose may also be derived by coating on a layer of acetyl cellulose, and then treating it with a saponifying agent to wholly or partially saponify it or its outer surface, as indicated in Patent No. 1,074,092, Mork, September 23rd, 1913.

In Fig. 10 is shown a film in which the main supporting layer 2 of β caoupren chloride is coated on each face with a relatively thinner layer 5 of nitrocellulose. The emulsion layer 1 is attached to the nitrocellulose in the usual manner.

In Fig. 11 there is disclosed a film in which an inner layer 5 comprises nitrocellulose and two outer layers 2 comprise β caoupren chloride. An emulsion layer 1 is located upon one of the latter. This film has very high flexibility and good resistance toward burning.

The layers 2 of β caoupren chloride in the above examples contain preferably one or more colloidizing agents of low volatility, such as monochlorbenzol, dichlorbenzol, trichlorbenzol, etc. These cellulosic layers also preferably remain colloidized by reason of their retention of some of the substances of low volatility, mentioned in the cellulose acetate, cellulose ether, and cellulose nitrate formulæ given above. The colloidized state accompanies transparency and flexibility in our preferred forms.

The cooperating colloid layers 3, 4, 5, and/or the emulsion layer 1 may contain absorbents of ultra-violet rays which might adversely affect layer 2. Thus a little aesculin can be used to absorb such rays, or a more permanent yellowish dye. This precaution, however, is not essential.

Having thus described my invention, what I claim as new and desire to secure by Letters Patent is:

1. A photographic film comprising a light-sensitive photographic layer, a flexible layer coextensive with said layer of polymerized vinyl compound, and a flexible colloid and easily electrifiable layer of a polymerized vinyl compound, and in condition to reduce the potential of electric charges formed on said polymerized vinyl compound layer.

2. A photographic film having a light-sensitive photographic layer carried by a laminated support, said support comprising a layer of flexible polymerized vinyl halid and a flexible cellulosic layer, coextensive with said layer of polymerized vinyl halid, and carried thereby.

3. A photographic film comprising a layer of flexible caoupren chloride bearing a light-sensitive photographic emulsion, and a substantially coextensive flexible colloid layer in condition to reduce the potential of electric charges formed on said layer of caoupren chloride.

4. A photographic film having a light-sensitive photographic layer carried by a laminated support, said support comprising a layer of flexible polymerized vinyl halid and a flexible layer of cellulose acetate, coextensive with said layer of polymerized vinyl halid and carried thereby.

5. A photographic film comprising a layer of flexible caoupren chloride bearing a light-sensitive photographic emulsion, and a substantially coextensive adherent flexible cellulosic layer.

6. A photographic film comprising a light-sensitive photographic layer carried by a laminated support, said support comprising a layer of relatively stronger and more flexible caoupren chloride, and a layer of relatively less flexible cellulose acetate coextensive with said layer of caoupren chloride and carried thereby.

7. A photographic film comprising a light-sensitive photographic layer, a layer of flexible β caoupren chloride and a flexible colloid layer coextensive with said layer of β caoupren chloride and in condition to reduce the potential of electric charges formed thereon.

8. A laminated photographic film having at least three substantially coextensive layers, the outer layer on one side of the film being a light-sensitive photographic emulsion and the outer layer upon the other side thereof being a flexible, transparent cellulosic layer, there being located between said outer layers a layer of flexible, transparent caoupren chloride.

9. A photographic film having a light-sensitive photographic coating carried by a laminated support, said support comprising a flexible layer of polymerized vinyl compound and a flexible colloid layer on each face of said first named layer, said colloid layers being substantially coextensive with said first named layer.

10. A photographic film comprising a light-sensitive photographic coating carried by a laminated support, said support comprising a flexible layer of polymerized vinyl halid and a flexible cellulosic layer on each face of said first named layer.

11. A photographic film having a light-sensitive photographic coating carried by a laminated support, said support comprising a layer of flexible caoupren chloride having on each of its faces a flexible layer of cellulose acetate.

12. A laminated photographic film having at least three layers, the outer layer upon one side being a light-sensitive photographic emulsion and the outer layer upon the other side of said film being a flexible, transparent cellulosic layer, there being located between said outer layers and in adherent contact with at least one of them a transparent, flexible layer of β caoupren chloride.

13. A laminated photographic film comprising at least three substantially coextensive layers, the outer layer upon one side being a light-sensitive photographic emulsion, and the outer layer upon the other side of said film being a flexible, transparent layer of cellulose acetate, there being located between said layers a flexible, transparent layer of β caoupren chloride, the last-named layer being in adherent contact at least with said cellulose acetate layer to reduce the potential of electric charges formed on said β caoupren chloride layer.

14. As an article of manufacture adapted to receive photographic coatings, a laminated film support comprising a flexible and easily electrifiable layer of a polymerized vinyl compound, and a flexible colloid layer extending over said first named layer in condition to reduce the potential of electric charges formed on said first named layer.

15. As an article of manufacture a laminated film comprising a layer of flexible polymerized vinyl halid and a flexible cellulosic layer, coextensive with said first named layer and carried thereby.

16. As an article of manufacture a laminated film comprising a flexible layer of caoupren chloride bearing on one of its faces a substantially coextensive flexible colloid layer.

17. As an article of manufacture a laminated film comprising a layer of flexible polymerized vinyl halid and a layer of cellulose acetate.

18. As an article of manufacture a laminated film comprising a layer of flexible caoupren chloride having on one of its faces and coextensive therewith a flexible adherent cellulosic layer.

19. As an article of manufacture a laminated film comprising a layer of flexible caoupren chloride and a layer of cellulose acetate.

20. As an article of manufacture a laminated film comprising a layer of $\beta$ caoupren chloride of relatively higher strength and flexibility and a substantially coextensive colloid layer of less strength and flexibility.

21. As an article of manufacture a laminated film comprising a flexible layer of a polymerized vinyl compound, and having on each face thereof a substantially coextensive flexible colloid layer.

22. As an article of manufacture a laminated film comprising a flexible layer of polymerized vinyl halid bearing on each of its faces a substantially coextensive flexible cellulosic layer.

23. As an article of manufacture a laminated film comprising a flexible layer of caoupren chloride bearing upon each of its faces a flexible layer of cellulose acetate.

24. As an article of manufacture a laminated film comprising a layer of flexible transparent $\beta$ caoupren chloride and a layer of flexible transparent cellulosic material closely adherent to one face of said first named layer.

25. As an article of manufacture a laminated film comprising a flexible transparent layer of $\beta$ caoupren chloride and a flexible transparent layer of cellulose acetate.

Signed at Rochester, New York, this 27th day of March 1926.

RAY L. STINCHFIELD.

Certificate of Correction.

Patent No. 1,627,935.      Granted May 10, 1927, to

RAY L. STINCHFIELD.

It is hereby certified that error appears in the printed specification of the above-numbered patent requiring correction as follows: Page 4, commencing with line 11, strike out all to and through line 19, which comprises claim 1, and insert the following as claim 1:

1. A photographic film comprising a light-sensitive photographic layer, a flexible and easily electrifiable layer of a polymerized vinyl compound, and a flexible colloid layer coextensive with said layer of polymerized vinyl compound, and in condition to reduce the potential of electric charges formed on said polymerized vinyl compound layer.;

and that the said Letters Patent should be read with this correction therein that the same may conform to the record of the case in the Patent Office.

Signed and sealed this 28th day of June, A. D. 1927.

[SEAL.]      M. J. MOORE,
Acting Commissioner of Patents.